UNITED STATES PATENT OFFICE

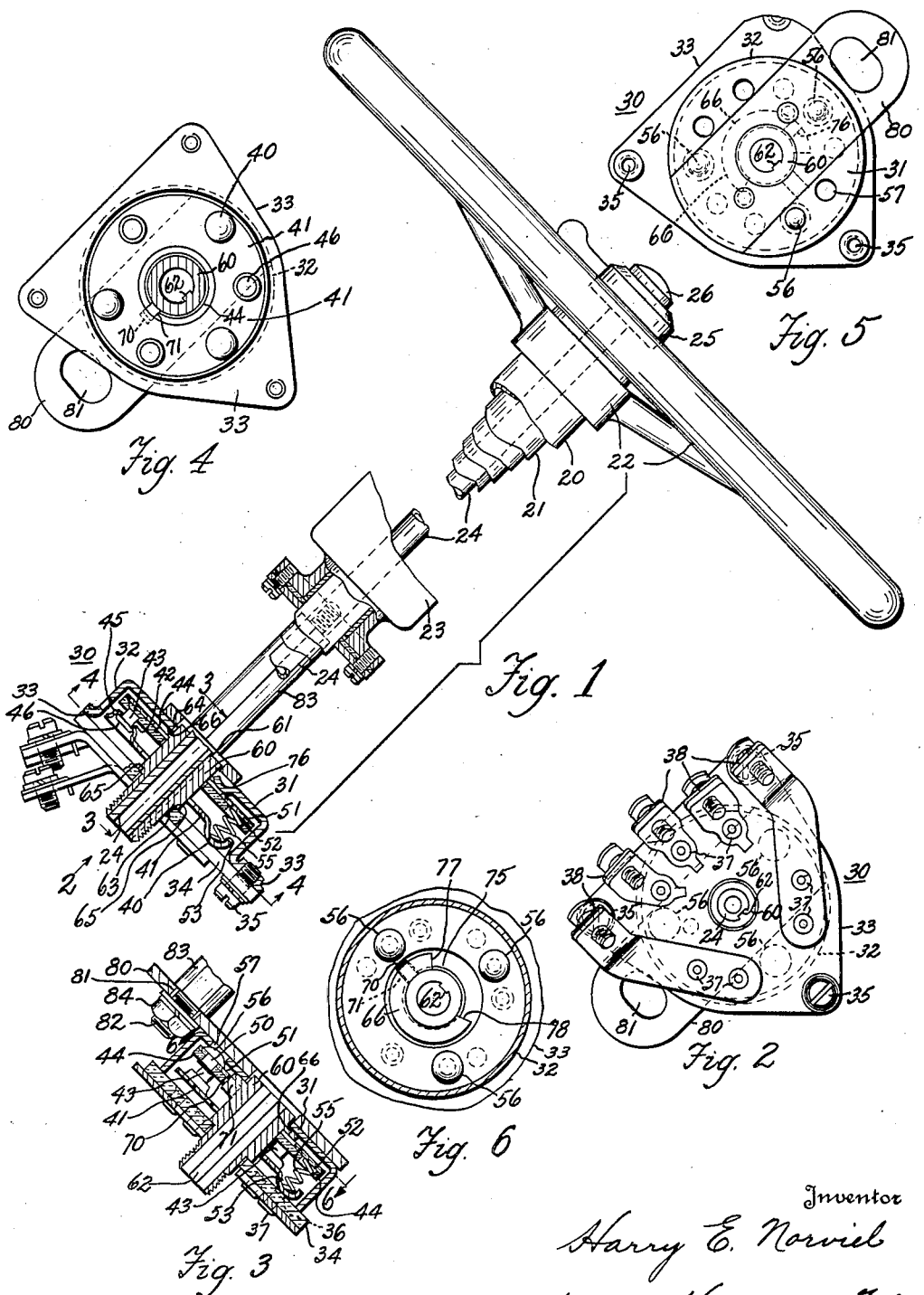

HARRY E. NORVIEL, OF ANDERSON, INDIANA, ASSIGNOR TO DELCO-REMY CORPORATION, OF DAYTON, OHIO, A CORPORATION OF DELAWARE

ELECTRIC SWITCH

Application filed November 29, 1927. Serial No. 236,534.

This invention relates to electric switches which are adapted to be mounted on the lower end of a steering column of an automobile and to be operated by a lever or other handle near the steering wheel and connected with a tube or rod extending through the steering column and operatively connected with the switch.

One object of the present invention is to provide a switch in which the moving parts will automatically accommodate themselves to operation by a member which may not move exactly in a path corresponding to the prescribed path of movement of the movable switch parts. For example, if the switch has a rotatable contact which is operated by a rotatable rod, the connection between the contact and rod is such as to permit movement of the rod laterally with respect to the contact while the rod is rotated.

Another object is to provide for adjustably mounting the switch case upon the lower end of the switch column in such manner as to permit shifting the switch case laterally of the steering column so that the switch shaft can be aligned approximately with the switch operating tube of the steering column, and in such manner as to permit limited angular movement of the switch case relative to the steering column so that the switch contacts can be located in a certain position relative to the switch operating handle above the steering wheel.

Further objects and advantages of the present invention will be apparent from the following description, reference being had to the accompanying drawings, wherein a preferred form of embodiment of the present invention is clearly shown.

In the drawings:

Fig. 1 is a view in which fragments of the upper and lower end of the steering column are shown and in which the switch embodying the present invention is shown in longitudinal section.

Fig. 2 is a bottom view of the switch looking in the direction of the arrow 2 in Fig. 1.

Figs. 3 and 4 are sectional views on the lines 3—3 and 4—4 respectively of Fig. 1.

Fig. 5 is a top view of the switch not mounted upon the steering column.

Fig. 6 is a sectional view on the line 6—6 of Fig. 3.

The steering column comprises a mast 20 having a bearing for supporting a steering tube 21 attached to a steering wheel 22 and operatively connected with a steering gear not shown contained within its steering gear housing, a fragment of which is shown at 23. The steering tube 21 encloses a number of concentric tubes, the inner of which only concerns the present invention. This tube 24 is connected at its upper end with a handle or knob 25 which may also support a horn button 26 which controls the circuit of the automobile horn. A wire, not shown, for connecting the horn button switch with the horn, is usually led through the tube 24.

The switch which is operated by the handle 25 and tube 24 includes a switch case 30 having a flat back wall 31, a cylindrical side wall 32 and a flange 33 to which is attached a non-conducting cover plate 34 by screws 35. The plate 34 carries a number of contacts 36 arranged in an arcuate series and provided by the heads of rivets 37 which are flush with the inner surface of the plate 34. These rivets make electrical connections between terminals 38 and certain of the contact rivets 36. The stationary contact rivets 36 are engaged by certain of the spherical projections or bosses 40 provided by a sheet metal ring 41 having holes 42 each receiving a rivet 43 attached to a non-conducting plate 44. Each hole 42 is formed through an internal annular flange 45 which cooperates with the head 46 of a rivet 43 to limit separation of the plate 41 from the plate 44 while permitting the plate 44 to approach the plate 41 for a reason to be described later. The connections which have been described provide a driving connection from the plate 44 to the plate 41 while providing also for relative axial movement of these members.

The non-conducting plate 44 is attached by rivets 50 to a non-conducting ring-shaped plate or washer 51 which provides enclosures for the spring receiving recesses provided by the holes 52 in the plate 44 as shown in Fig. 3.

Each spherical boss 40 of the plate 41 provides a recess 53 in alignment with one of the recesses 52 of the plate 44. Springs 55 are located between the plate 41 and the washer 51, and each spring is retained by having its ends located in aligned recesses 52 and 53. It is therefore seen that the springs 55 have two functions, one being to urge the contact bosses 40 against the stationary contacts 36 of the switch and the other being to urge the spherical heads 56 of the rivets 50 against the back wall 31 of the switch case and in order to yieldingly retain the rivet heads 56 within recesses provided by holes 57 located in an arcuate series in the back of the switch case and concentric with the axis of the cylindrical wall 32. The holes 57 and rivet heads 56 are so located with respect to each other and to the switch contacts 36 that for each position of the switch contact member 41 the three rivet heads 56, which are shown in Fig. 6, will be received by a certain three of the holes 57. In this way the movable contact is yieldingly retained in its different operating positions.

Rotation is transmitted from the tube 24 to the plate 44 by an operating shaft 60 which has a sliding fit over the lower end of the tube 24 and is drivingly connected therewith by providing the tube with a longitudinal groove 61 for receiving a key 62 integral with the shaft 60. The shaft 60 extends loosely through a bearing hole 63 provided in the plate 34 and a bearing hole 64 provided in the back wall of the switch case.

The shaft 60 is confined endwise by providing it with a shoulder 65 engageable with the inner surface of the cover plate 34, and by providing it with a flange 66 engageable with the inner surface of the back wall 31. Thus the shaft 60 may move laterally with respect to the switch case while it is being turned by the shaft 24. The shaft 60 is drivingly connected with the plate 44 by providing the plate with a notch 70 for receiving a lug 71 provided by the shaft 60. The notch 70 extends radially and is longer than the lug 71 so as to provide for relative lateral movement between the shaft 60 and the plate 44. Rotation of the shaft 60 relative to the case is limited by cutting away a portion of the flange 66 in order to provide a notch 75 for receiving a lug 76 formed by the back wall 31. The end surfaces 77 and 78 of the flange 66 are adapted to strike the lug 76 in order to limit the rotation of the shaft 60.

The switch case is attached in any suitable manner to the mounting plate 80 having an arcuate slot 81 for receiving the threaded end 82 of a stud 83 which is attached to the steering gear housing 23 and is adapted to hold the switch case in a definite spaced relation to the gear housing 23. A nut 84 cooperates with the stud 83 to clamp the mounting plate 80 to the stud in the desired position of adjustment. The slot 81 is made larger than the threaded end of the stud in order to permit of lateral adjustment of the switch case. Since the slot is arcuate, a limited amount of angular adjustment of the switch case relative to the steering column may be made in order to adjust the location of the switch relative to the operating handle 25.

If the lower end of the tube 24 should rotate so that its axis moves in an orbit with respect to the switch case instead of rotating coaxial to the switch case such a movement will not interfere with the operation of the switch nor the rotation of the handle 25. The switch is so constructed that the shaft 60 may shift laterally with respect to the switch case, and the connection between the shaft 60 and the movable contact of the switch is such as to permit of relative lateral movement between these parts. Thus, while the switch movable contact is rotating about its own axis, the switch shaft may rotate about a center which is eccentric to the axis of the switch movable contact. The switch movable contact 41 and the plate 44 carrying the detent rivet heads 56 may be said to be floatingly supported between two parallel walls provided by the switch case cover plate 34 and the switch back plate 31. The operating shaft 60 is likewise floatingly supported between these parallel walls and is so connected with the plate 44 that there may be lateral movement of the shaft 60 relative to the switch movable contact.

This construction also makes it unnecessary to mount the switch case upon the steering gear case with such accuracy as to insure that the switch case will be exactly concentric with the operating tube 24. The construction will permit a slight eccentricity of these parts while not interfering with the operating of the switch.

While the form of embodiment of the present invention as herein disclosed, constitutes a preferred form, it is to be understood that other forms might be adopted, all coming within the scope of the claims which follow.

What is claimed is as follows:

1. An electric switch comprising a housing having parallel walls, a movable contact support and a movable contact plate confined between said walls, means resiliently urging the support and plate apart, means drivingly connecting the support and plate and providing for relative movement of the support and plate 1, including rivets secured to said support and loosely engaged by said plate, means for rotating the support, stationary contacts on one wall of the housing and engaged by portions of the contact plate, and means provided by the other wall of the housing and the support and cooperating to yieldingly retain the support in different positions of movement.

2. An electric switch according to claim 1 in which the support carries projections adapted to be received by recesses in the wall of the housing adjacent to the support.

3. An electric switch comprising a housing having parallel walls, a movable contact support and a movable contact plate provided between said walls, means resiliently urging the support and plate apart including coiled springs located between the support and plate, one end of each spring being received by one of several holes in the support, a second plate located between the support and the adjacent end wall of the housing, and rivets for securing the second plate to the support, the said housing end wall having recesses for receiving the heads of said rivets, whereby the springs serve to yieldingly maintain the support in different positions.

4. An electric switch comprising a housing having parallel walls, a movable contact support and a movable contact plate provided between said walls, means resiliently urging the support and plate apart, means drivingly connecting the support and plate and providing for relative movement of the support and plate by headed members extending through aligned holes in the support and plate, said switch having a second plate located between said support and the adjacent end wall of the housing and covering the heads of said members, and rivets for securing the second plate to the support, the said housing end wall having recesses for receiving the heads of said rivets, whereby the support is yieldingly retained in different positions.

5. An electric switch comprising a housing, carrying stationary contacts on one of its end walls, a movable contact rotatable within the housing, and engageable with said stationary contacts, an operating shaft extending into the housing, and means drivingly connecting the shaft with the movable contact, said movable contact being laterally movable relative to said shaft, and in which the means which drivingly connects the shaft and movable contact provides also for relative axial movement between the shaft and movable contact.

6. An electric switch comprising a housing, carrying stationary contacts on one of its end walls, a movable contact rotatable within the housing, and engageable with said stationary contacts, an operating shaft extending into the housing, and means drivingly connecting the shaft with the movable contact, said movable contact being laterally movable relative to said shaft, and in which the movable contact is driven by a contact support through means providing for relative axial movement between the contact and support, and in which the housing supports a tubular operating shaft losely journalled in end walls of the housing, and in which means are provided for connecting the shaft and contact support in such manner that the shaft, while rotating, may move laterally with respect to the contact support.

7. An electric switch comprising a housing, carrying stationary contacts on one of its end walls, a movable contact rotatable within the housing, and engageable with said stationary contacts, an operating shaft extending into the housing, and means drivingly connecting the shaft with the movable contact, said movable contact being laterally movable relative to said shaft, and in which opposite walls of the switch housing provide bearings in which the switch shaft is loosely journalled, and in which means are provided for connecting the shaft and contact in such manner that the shaft, while rotating, may move laterally with respect to the contact.

8. An electric switch comprising a housing having parallel walls, one of which is provided with stationary contacts in an arcuate series and the other with recesses in an arcuate series, a rotatable, ring-shaped contact plate having portions for engaging the stationary contacts, a rotatable, non-conducting, ring-shaped plate having projections adapted to be received by said recesses in the housing, resilient means urging the plates apart, means restraining said resilient means and drivingly connecting the plates and providing for relative axial movement thereof, and a shaft for driving the non-conducting plate.

9. A switch according to claim 8 in which the shaft is loosely journalled in bearings provided by said walls of the housing and is connected with the non-conducting plate by means providing for lateral movement of the shaft as it is rotated.

10. An electric switch according to claim 8 in which the contact ring is provided with contact bosses facing from one side of the ring toward the stationary contacts and providing on the opposite side of the contact ring seats for receiving ends of springs which are retained also within recesses provided by holes in the non-conducting ring, said switch having a non-conducting ring-shaped plate located between the first non-conducting plate and the housing wall adjacent thereto, said second non-conducting plate closing the spring receiving holes in the first non-conducting plate and being secured to the first non-conducting plate by rivets, the heads of which constitute the projections carried by the non-conducting plate and adapted to be received by the recesses in the housing end wall.

In testimony whereof I hereto affix my signature.

HARRY E. NORVIEL.